Figure 1:
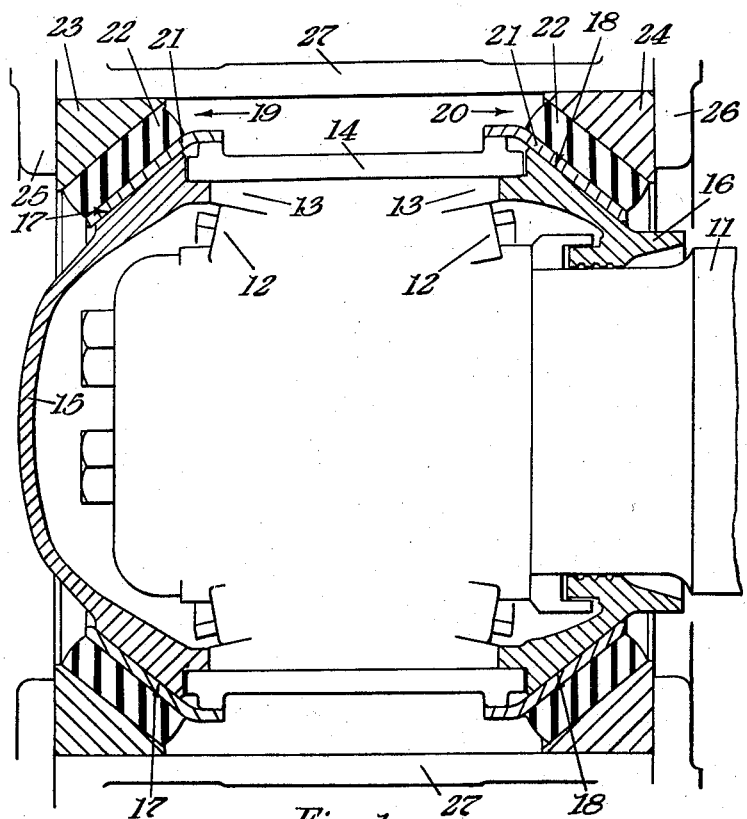

April 1, 1958 — A. J. HIRST — 2,829,016

AXLE BOX MOUNTINGS

Filed Nov. 10, 1954

Inventor
Archie J. Hirst
By Ralph B. Stewart
Attorney

United States Patent Office 2,829,016
Patented Apr. 1, 1958

2,829,016

AXLE BOX MOUNTINGS

Archie John Hirst, Leicester, England, assignor to Metalastik Limited, Leicester, England, a corporation of Great Britain Application November 10, 1954, Serial No. 468,130

Claims priority, application Great Britain November 25, 1953

3 Claims. (Cl. 308—184)

This invention relates to mountings for the axle boxes of railway and like vehicles including locomotives.

It is one of the objects of the invention to provide an axle box mounting in which there shall be a high resistance to translational movements of the bearing relative to its housing, whether those translational movements be axial or radial; while at the same time there shall be a low resistance to angular or rotational movement.

It is a further object to maintain in all conditions a uniform symmetrical loading of the axial box bearing, the housing being allowed to tilt relatively to the bogy frame or equivalent structure, so that rolling movement is freely permitted and does not result in conical loading on the bearing.

In accordance with one of the features of this invention an axle box is mounted within a resilient system comprising a plurality of resilient elements of rubber or the like material which by reason of their disposition around the axle box have a common centre for their axes of maximum stiffness so that the system simulates a sphere concentric with the axle bearing.

In accordance with a further feature of the invention an axle box is mounted between a pair of opposed conical annuli of rubber or the like material arranged tangentially to a sphere or concentric spheres having a common centre with the axle bearing.

In accordance with yet a further feature of the invention an axle box is mounted between a pair of sets of resilient elements of rubber or the like material all having their axes of maximum stiffness pointing to a common centre.

The common centre above referred to should coincide with the centre of the axle bearing, which may be for instance a pair of taper roller bearings, so that the normal gravity loading is carried in the most favourable manner, that is without substantial offset on the bearing. It may however be desired to have the said common centre displaced from the bearing centre; in that case it is still to be preferred that it should remain on the same vertical line, that is the vertical line through the bearing centre.

Where use is made of conical annuli, these will be of small slant length relative to their diameter. When sets of resilient elements are used, these elements may take the form of flat sandwich mountings such as circular bobbins having a stiffness along the compression axis many times that in the shear plane. In either case the rubber or like material may be bonded to a metal armouring.

Figure 2:
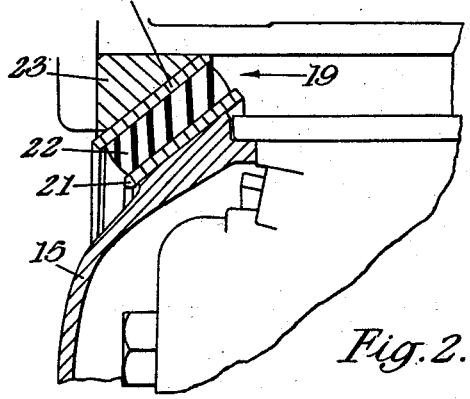

The following description relates to the accompanying drawings, the description and the drawings being offered by way of example only. These embodiments of the invention were designed for use in mounting the axle boxes of a railway freight or passenger car. In the drawings:

Figure 1 is an axial section through an axial box mounting in accordance with the invention; and Figure 2 is a similar section through a part showing the modification.

As shown in Figure 1 of the drawing the axle 11 is supported in known manner by a pair of taper bearings indicated generally at 12 but not shown in detail, these taper bearings havings outer races 13 mounted within a bearing ring or sleeve 14, which extends from the axle box end cap 15 on the further side to the inner bearing end cover ring 16 on the nearer side. Both the end cap 15 and the end cover 16 are formed with external conical surfaces 17 and 18 oppositely directed, that is to say the conicity of the further surface 17 is towards an apex yet further removed from the axle centre while that of surface 18 is towards an apex nearer the centre.

Two pre-assembled resilient elements 19 and 20 each consist of an inner conical metal annulus 21 and a rubber annulus 22 surface-bonded to the outer conical surface of the metal annulus 21 in known manner. These two resilient elements 19, 20 are arranged oppositely, with the inner conical surfaces of their inner metals 21 seating firmly upon the conical surfaces 17 and 18 on the cap 15 and cover 16.

The outer surfaces of the rubber elements 22 of the resilient elements 19 and 20 are engaged by corresponding conical surfaces formed internally on two loose triangular-section packing rings 23 and 24. These packing rings 23 and 24 are held in the corners between the axle box end plates 25 and 26 and main housing ring 27.

The dimensions of the parts are such that when the mounting is assembled and in particular when the axle box end plates 25 and 26 are clamped into position, the two rubber cones 22 in the elements 19 and 20 are preloaded against each other to an extent sufficient to prevent the metal to metal abutment surfaces from operating under any load normally applied and also to prevent the mountings from coming into tension at any point due to the deviation of the cone from the sphere.

In the modification shown in Figure 2 instead of the pre-assembled resilient elements 19 and 20 consisting only of an inner metal annulus 21 and a rubber annulus 22, they comprise an inner metal annulus 21, a rubber annulus 22 and outside the rubber annulus 22 an outer metal annulus 28 which is also bonded to the rubber annulus 22, the outer surface of this outer element 28 being engaged by the corresponding packing ring 23 or 24.

What I claim is:

1. A mounting for an axle box of a railway and like vehicle comprising an axle box bearing sleeve, a removable end cap closing one end of said sleeve and having an annular conical surface formed on its outer periphery, a removable cover ring partly closing the other end of said sleeve and having a conical surface formed on its outer periphery, said conical surfaces facing outwardly from the center of said sleeve, a conical ring of rubber engaging each conical surface so that the axes of maximum stiffness of the rubber rings intersect near the axis of rotation of the axle box, and means for pressing the rubber rings axially together to support the axle box by said rubber rings and to pre-load said rubber rings to a pressure sufficient to prevent said rubber rings from being subjected to tension under normal loading on said axle box.

2. A mounting according to claim 1 and including a conical metallic ring interposed between each rubber ring and the adjacent conical surface, each metallic ring being bonded to the adjacent rubber ring.

3. A mounting according to claim 2 and including a conical metallic ring bonded to the outer conical surface of each rubber ring.

References Cited in the file of this patent

UNITED STATES PATENTS

| | | |
|---|---|---|
| 2,141,122 | Boden | Dec. 20, 1938 |
| 2,282,589 | Mayne | May 12, 1942 |
| 2,365,875 | Hersey et al. | Dec. 26, 1944 |
| 2,421,529 | Tyler | June 3, 1947 |
| 2,685,425 | Wallerstein | Aug. 3, 1954 |